US008695917B2

(12) United States Patent
Cranga et al.

(10) Patent No.: US 8,695,917 B2
(45) Date of Patent: Apr. 15, 2014

(54) VIBRATION DAMPER MECHANISM, AND A FLYING MACHINE INCLUDING A CARRIER STRUCTURE AND A ROTOR PROVIDED WITH SUCH A MECHANISM

(75) Inventors: Paul Cranga, Marseilles (FR); Thomas Manfredotti, La Colle sur Loup (FR); Joachim Re, Aix en Provence (FR); Matthieu Pula, Aix en Provence (FR)

(73) Assignee: Airbus Helicopters, Marignane Cedex (FR)

( * ) Notice: Subject to any disclaimer, the term of this patent is extended or adjusted under 35 U.S.C. 154(b) by 227 days.

(21) Appl. No.: 12/968,653

(22) Filed: Dec. 15, 2010

(65) Prior Publication Data

US 2011/0155841 A1    Jun. 30, 2011

(30) Foreign Application Priority Data

Dec. 17, 2009  (FR) ...................................... 09 06121

(51) Int. Cl.
*B64C 27/51* (2006.01)
*F01D 5/26* (2006.01)
*F16F 7/104* (2006.01)

(52) U.S. Cl.
USPC ......... 244/17.11; 267/136; 416/140; 188/379

(58) Field of Classification Search
USPC ............... 244/17.19, 17.25, 17.27, 17.11, 60;
416/106, 107, 134 A, 140, 144, 145,
416/500; 267/136; 188/378, 379, 380;
248/550
See application file for complete search history.

(56) References Cited

U.S. PATENT DOCUMENTS

| 3,484,173 | A | * | 12/1969 | Rybicki | 416/106 |
|---|---|---|---|---|---|
| 4,915,585 | A | * | 4/1990 | Guimbal | 416/140 |
| 5,141,398 | A | * | 8/1992 | Bietenhader et al. | 416/107 |
| 5,636,970 | A | * | 6/1997 | Certain | 416/106 |
| 5,934,424 | A |   | 8/1999 | Hosek et al. | |
| 5,951,251 | A | * | 9/1999 | Mondet et al. | 416/107 |
| 6,062,818 | A | * | 5/2000 | Manfredotti et al. | 416/145 |
| 6,494,680 | B2 | * | 12/2002 | Cardin | 416/145 |
| 6,676,074 | B2 | * | 1/2004 | Zoppitelli et al. | 244/17.11 |
| 6,695,254 | B2 | * | 2/2004 | Zoppitelli et al. | 244/17.11 |
| 7,607,892 | B2 | * | 10/2009 | Beroul | 416/106 |
| 8,123,483 | B2 | * | 2/2012 | Beroul | 416/140 |
| 8,297,549 | B2 | * | 10/2012 | Nannoni et al. | 244/17.19 |
| 2003/0012650 | A1 | * | 1/2003 | Ferullo | 416/106 |

FOREIGN PATENT DOCUMENTS

FR   2784350 A1   4/2000
FR   2808256 A1   2/2001

OTHER PUBLICATIONS

French Search Report and Written Opinion, Application No. FR 0906121, dated Jul. 23, 2010.

* cited by examiner

*Primary Examiner* — Joseph W Sanderson
*Assistant Examiner* — Marc Burgess
(74) *Attorney, Agent, or Firm* — Brooks Kushman P.C.

(57) ABSTRACT

A vibration damping mechanism (90) for damping vibrations to prevent coupling of vibration modes of the carrier structure (106) with vibration modes of a rotor (100) secured to the carrier structure (106). The mechanism comprises a support (3) suitable for being fastened to the rotor (100) and at least one resonator (1) including a mass (5) carried by the support (3) via mobile mounts (6) for mounting the mass (5) to move on the support (3), the mechanism (90) including at least one damper (8) for damping the resonator (1), with the damper being interposed between the resonator (1) and an engagement member (9) on the support (3).

16 Claims, 3 Drawing Sheets

VIBRATION DAMPER MECHANISM, AND A FLYING MACHINE INCLUDING A CARRIER STRUCTURE AND A ROTOR PROVIDED WITH SUCH A MECHANISM

CROSS REFERENCE TO RELATED APPLICATION

This application claims the benefit of FR 09 06121 filed on Dec. 17, 2009. The disclosure of which is incorporated in its entirety by reference herein.

FIELD OF THE INVENTION

The present invention relates to the field of equipment for a flying machine comprising a carrier structure connected to a rotor, such as an airplane propeller or a rotor of a rotorcraft, e.g. a helicopter. More particularly, the present invention relates to mechanisms for damping vibration induced by aeroelastic instabilities resulting from coupling between modes of vibration of the carrier structure and modes of vibration of the rotor. The invention provides such a mechanism and a flying machine provided with such a mechanism.

BACKGROUND OF THE INVENTION

Aircraft include flying machines fitted with a rotor connected to a carrier structure, e.g. an airplane fitted with a propeller or a rotorcraft fitted with a rotor for providing lift and possibly propulsion.

The rotor conventionally comprises a rotor mast secured to a hub, the hub carrying a plurality of radially-distributed blades.

Furthermore, the carrier structure possesses an airframe, sometimes referred to as a "fuselage", having engine means arranged therein suitable for driving the rotor in rotation. In addition, the carrier structure includes a rotor-mounting structure enabling the rotor to be fastened to the airframe.

Such a mounting structure usually includes mechanical transmission means and fastener elements for fastening the transmission means to the airframe. For example, a mounting structure of a rotorcraft known as a "pylon" comprises a main gearbox for transmitting power and means for fastening said main gearbox to the airframe, such as suspension bars, for example.

The engine means of the carrier structure then drive the rotor via the gearbox means of the mounting structure.

The carrier structure and the rotor are each subjected to forced excitations inherent to the speed of advance of the aircraft.

The dynamic excitation of the rotor, e.g. the lift and propulsion rotor of a helicopter, results from aerodynamic loads to which the rotor is subjected, these aerodynamic loads being resolved along stationary axes as a coplanar force acting in the general plane of the rotor hub, which plane is perpendicular to the axis of rotation of the rotor, an axial force that acts along the axis of rotation of the rotor, and a coplanar moment acting in a plane perpendicular to the axis of rotation of the rotor tangentially to the rotary movement of the rotor hub. The frequencies of such vibrations along axes that are "fixed", i.e. tied to the airframe of the carrier structure, are equal to the product $kb\Omega$, where "$\Omega$" designates the speed of rotation of the rotor, "b" designates the number of blades, and "k" designates a positive integer. The fundamental frequencies correspond to the number "k" being equal to unity. These excitations are transmitted from the rotor to the structure via the pylon.

Similarly, the carrier structure is subjected to forced excitations. For example, the tail boom of a helicopter airframe is excited directly by a stream of turbulent air coming from the main lift and propulsion rotor.

Flying machines fitted with a rotor are generally structured to mitigate the consequences of such vibrations.

To this end, it is common practice to fit the rotor or the structure with anti-vibration systems, sometimes referred to as resonators, for filtering the dynamic forces at the frequencies that are the most troublesome, whether from the point of view of passenger comfort or from the need to avoid breaking an element that is subjected to such vibratory fatigue. These anti-vibration systems are then tuned to one of the harmonics of the speed of rotation of the rotor.

Under such conditions, proposals have been made, e.g. in document FR 2 808 256 (Eurocopter France), for pendular resonators in which the masses are mounted in pendular manner on the hub of the rotor head. Such pendular resonators serve to oppose the forced vibrations induced by the rotating rotor head by acting along the axis and in the plane of the rotor. The stiffness needed for such pendular resonators in order to filter the vibrations is provided by the centrifugal force field due to the rotation of the rotor. This rotation drives the pendular masses about hinges so that they perform harmonic motion at a frequency that is a multiple of the speed of rotation $\Omega$ of the rotor. The structure of such pendular resonators makes them easy to integrate in the rotor head.

Nevertheless, such pendular resonators are effective only at one given frequency. Such pendular resonators are arranged to be fitted to a rotor head located at the top of the carrier structure, the rotor providing lift and possibility also propulsion, and they do not take account of characteristics specific to the carrier structure, relating in particular to its mass and to its excitation frequency.

The effect of the resonators is to smooth vibration by creating anti-resonance at the given tuned frequency. Consequently, the resonator generates two new resonances (or modes of vibration) at two respective frequencies that are situated on either side of the anti-resonance frequency. The frequency range defined by these two modes remains relatively narrow. Nevertheless, these two modes of vibration created by the resonators are normally not troublesome insofar as both resonances differ from the given frequency that is to be filtered.

Document U.S. Pat. No. 5,934,424 proposes moving a mass with the help of a motor, the motor moving said mass as a function of information coming from a measurement sensor. That document therefore discloses the existence of a controlled pendulum, instead of a simple self-adaptive system.

Vibration damper mechanisms are also known for damping the vibration that is the result of the forced excitation of the carrier structure. By way of example, reference may be made to document FR 2 784 350 (Eurocopter France) that describes a damped resonator arranged to be implanted in the tail of the carrier structure in order to filter given frequencies.

In addition to forced excitation, another vibratory phenomenon may give rise to major problems.

In the field of aviation in particular, a problem lies in attenuating vibratory phenomena induced by the aeroelastic instabilities to which a machine is subjected in flight. For example, such aeroelastic instabilities may result from coupling between the vibration modes of the carrier structure and the stream of air moving around it, i.e. in particular a fixed wing type structure (airplane wing) or a rotary wing type structure (rotor blades of a rotorcraft or airplane propeller). These instabilities are known to the person skilled in the art under the general term "flutter".

Other aeroelastic instabilities correspond for example to the instabilities known as "whirl flutter" designating coupling between vibration modes of a rotor fitted with blades and vibration modes of the carrier structure supporting the rotor.

These phenomena of "flutter" and of "whirl flutter" are characterized by limit cycle vibration or by diverging vibration that can lead to breaking mechanical parts or structural elements. It is therefore essential to take these phenomena into account in the design of an aircraft in order to ensure that the critical speeds (forward speed, speed of rotation of the rotor) lie outside the limits of the flight envelope.

In particular, with whirl flutter, manufacturers ensure that rotor modes do not couple with carrier structure modes, thereby ensuring that those two assemblies are mutually compatible. In general, this can be done by appropriately placing the resonance frequencies and the respective dampers of the modes of the various assemblies.

Nevertheless, it is difficult a posteriori to modify the modal characteristics of the carrier structure or of the rotor, should such phenomena appear while developing the aircraft. Furthermore, a manufacturer may need to modify an existing aircraft in order to satisfy specific requirements of a user, and that may have an impact on the behavior of the aircraft when faced with such instabilities.

To solve these phenomena that may arise in the manner explained above, the manufacturer cannot make use of the resonators as described above that serve to filter forced excitations but not couplings. Under such circumstances, the manufacturer often decides to modify the carrier structure, e.g. by making it stiffer, where such a modification involves not only a financial cost, but also an impact in terms of weight, neither of which are negligible. Furthermore, it may be difficult to make the modifications in question to an existing machine.

SUMMARY OF THE INVENTION

The present invention thus seeks to combat the phenomenon of coupling between vibration modes of the carrier structure and of the rotor of an aircraft, by means that are simple, inexpensive, and that can easily be implemented on an existing machine. The principle lies in providing damping for the modes of vibration that are involved in the unstable coupling.

According to the invention, a mechanism for damping vibrations to prevent coupling of vibration modes of the carrier structure with vibration modes of a rotor secured to the structure comprises a support suitable for being fastened to a rotor and at least one resonator including a mass carried by the support via mobile mounting means for mounting the mass to move on the support, the mechanism including damper means for damping the resonator, which means are interposed between the resonator and an engagement member on said support.

Thus, the mechanism is passive, comprising passive mobility mounting means and passive damper means. The mechanism is adjusted as a function of the resonant frequency of the resonant mode of vibration of the carrier structure to be treated.

The mechanism is thus self-adaptive and does not require any installation of sensors or control means for moving the mass.

It is recalled that damper means provide a force in phase quadrature with the movement of the body under consideration, thereby having an effect of limiting the amplitude of its oscillations. Means that generate friction have a completely different effect, where friction prevents one body from moving relative to another up to a certain force threshold. Friction is therefore not to be taken as being the same as damping.

The approach of the present invention thus consists in general terms in combining on a rotor not only a resonator with all of its own components, but also damper means associated with the resonator. The damper means are rated as a function of the characteristics specific to the carrier structure of the flying machine, and in particular as a function of its mass and its excitation frequency. The rotor is used as an interface between the resonator and the carrier structure for interposing the damper means, and members specific to the resonator are used at least in part for installing the damper means on the rotor, thereby having the advantage of reducing the size and the mass of the mechanism as much as possible. The entire mechanism is placed as close as possible to the source of harmonic vibrations and/or aeroelastic instabilities, with the advantage of thereby increasing its performance. The resonator and the damper means constitute members that are structurally distinct, the damper means being easily implanted on the machine independently of the previously-implanted resonators. Implanting damper means does not lead to a change in the carrier structure itself, and potentially they may be installed optionally, depending on requirements.

The effect of the mechanism is to damp vibration over a broad frequency band without creating anti-resonant vibration, unlike a conventional pendular resonator.

The damping provided serves to modify the vibration modes of the carrier structure supporting the rotor fitted with the mechanism, and thus to prevent destructive coupling being created between the vibration modes of the rotor and the vibration modes of the structure carrying the rotor.

Furthermore, it may be observed that the mechanism may be combined with a pendular resonator dealing with one of the harmonics of the rotor.

The mobile mounting means comprise one hinged arm per mass, the resonator is preferably of the pendular type comprising a mass carried in pendular manner by the support of the mechanism via a hinged arm. More specifically, the mass is carried on a branch or analogous member of said support with which it is associated. Such a branch is constituted in particular by a member extending radially beyond the axis of rotation of the hub, in a general plane that is orthogonal to said axis of rotation.

The arrangement of such a hinged arm makes it easy for it to be used in engaging the damper means with the mobile mounting means of the mass. The hinged arm is not only a member that imparts pendular mobility to the mass of the resonator, but it is also a member via which the damper means of the resonator are mounted on the support. The organization of the mechanism makes it easy to use damper means of almost any type, depending on requirements, the type of flying machine or the characteristics specific to the carrier structure that is to be preserved from vibration.

More particularly, the resonator constitutes means suitable for opposing vibration over a first narrow frequency range as induced by forced excitation to which the rotor is subjected. The damper means associated with the resonator are suitable for opposing vibration originating from instability in a second frequency range that is wider than said first frequency range and being adapted as a function of the characteristics of the carrier structure of the flying machine and/or as a function of imperfections observed in the damping of vibration, and are above all suitable for opposing aeromechanical instabilities (flutter, . . .).

In various embodiments, the engagement member may equally well be a stationary member or a movable member of the support. More particularly, the engagement member included in the hub is suitable for being a stationary member, such as a said branch or analogous member forming part of the support, or it may be a movable member such as a resonator, the damper means being interposed in engagement with two adjacent resonators, and more particularly with the hinged arms that each of them includes.

Furthermore, the mass is carried in pendular manner on the hub with freedom to pivot about at least one pivot axis. Such a pivot axis may be oriented equally well parallel to and/or perpendicularly to the axis of rotation of the hub. Also by way of example, the arm of the mobile mounting means of the mass is hinged on the support so as to pivot about an axis extending parallel to the axis of rotation of the rotor head in order to damp forced vibration specifically in the general plane of the rotor head by generating a force in said plane. Also by way of example, this arm is hinged to the support with freedom to pivot about an axis oriented orthogonally to the axis of rotation of the rotor head in order to attenuate or even damp forced vibration specifically outside the general plane of the rotor head by generating a torque outside said plane.

The hinged arm is advantageously arranged as a lever arm, having between its ends at least one zone of inflection. Such a zone of inflection may be formed for example by arranging the lever arm as an angle crank or as a T-shape. The hinged arm is hinged to the hub between its ends and to the damper means at one of its ends, in particular its end that is closer to the axis of rotation of the support. The hinged arm carries the mass at its other end such that the mass is placed as far away as possible from the axis of rotation of the rotor head.

The damper means may be of the mechanical deformation type, such as an oleo strut, or they may be elastic, e.g. using a member formed from an elastomer having a large loss angle.

Thus, the damper means may be of the hydraulic, pneumatic, elastic, or magnetic type, and do not include any mechanical friction means so as to ensure that small movements of the moving mass are allowed.

The damper means favorably have a damping coefficient that remains constant over time, and constant as a function of temperature and of the amplitude of the oscillation, so as to produce a force that is proportional to the speed of rotation of the mass.

A friction mechanism would not work properly since the mass would be allowed to move only above a certain force level. That would mean that the anti-vibration system would be blocked at low levels of excitation; thereby running the risk of the structure that is to be isolated having a limited cycle response characteristic so that the anti-vibration system would perform its function only at larger amplitudes of vibration.

In a variant, the resonator is mounted to move on a first branch of the support. The damper means are interposed between the mobile mounting means of the resonator and a second branch of the hub that is adjacent to the first branch and that constitutes said engagement member.

In another variant, a plurality of resonators is movably mounted on the support. The damper means are interposed between the mobile mounting means of two adjacent resonators on which the damper means are jointly engaged.

It is also possible for the damper means to be of the electromagnetic type, constituting magnetic members associated respectively with the resonator and with the support. More particularly, one of the magnetic members is arranged generally as a cage incorporating at least one magnetic element, the cage housing a body forming at least part of the other magnetic member.

In an embodiment, the resonator is mounted to pivot on the support via a hinged arm about an axis that is parallel to the axis of rotation of the support.

In a variant, the cage is carried by a branch of the hub on which the pendular resonator is mounted, the cage being located so as to be axially offset relative to the general plane in which the pendular resonator moves. The body is connected to the pendular resonator via a driving crank.

In another variant, the cage is carried by a branch of the support on which the pendular resonator is mounted. At least one magnetic element integrated in the cage is located in axially offset manner relative to the general plane in which the resonator moves, and the body constitutes at least part of the mass of the pendular resonator.

In yet another variant, the cage is carried by the hinged arm of the pendular resonator. The body constitutes at least a portion of the mass of the pendular resonator and is tangentially hinged to the end of a retaining connecting rod hinged to at its other end to the engagement member of the support.

The use of electromagnetic means, of size and weight that are advantageously small on the basis of using the mass of the pendular resonator to form one of the magnetic members, makes it possible to avoid friction between the moving parts.

An application of the mechanism of the present invention lies in particular in it being integrated in a rotor for installing at the top of a carrier structure, in particular in an application to a rotorcraft and more particularly to a helicopter. Nevertheless, it should be understood that the mechanism of the present invention may be applied to any rotor head for a flying machine.

In this context, the present invention also provides a flying machine having a rotor and a carrier structure including an airframe and a mounting structure for mounting the rotor to the airframe. This flying machine is remarkable in that the rotor includes a vibration damper mechanism of the invention as described above to prevent vibration modes of the carrier structure coupling with vibration modes of the rotor.

BRIEF DESCRIPTION OF THE DRAWINGS

Embodiments of the present invention are described below with reference to the figures of the accompanying sheets, in which.

DETAILED DESCRIPTION OF THE PREFERRED EMBODIMENT

Figure 1:
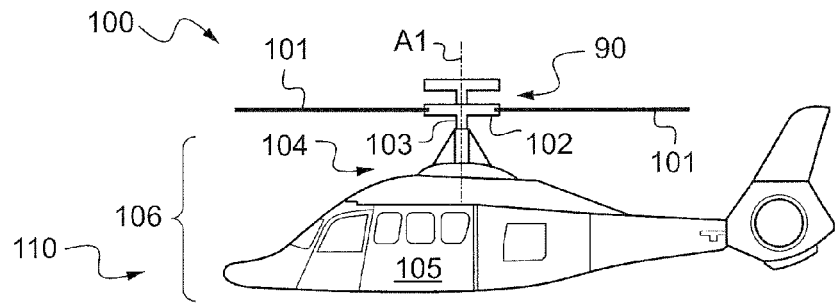
FIG. 1 shows an aircraft of the invention.

With reference to FIG. 1, a flying machine 110 of the invention comprises a rotor 100 carried by a carrier structure 106.

The carrier structure 106 possesses an airframe 105 suitable for receiving passengers and engine means, e.g. of the turbine engine type, together with a mounting structure 104 that includes transmission means and that carries the rotor 100. The transmission means are also connected to the engine means.

For example, in a helicopter, the mounting structure 104 comprises a main gearbox fastened on the airframe 105 by fastener members, e.g. of the suspension bar type.

The rotor 100 is then provided with a rotor mast 103 engaging firstly with the mounting structure 104 and secondly with a hub 102 of the rotor 100. At least two blades 101 are distributed radially around the hub 102.

According to the invention, a mechanism 90 is arranged on the rotor 100 to avoid creating coupling between the modes of vibration of the carrier structure and the modes of vibration of the rotor. The mechanism 90 comprises a support that is fastened to the hub 102. Under such circumstances, the mechanism 90 rotates about an axis of rotation A1 of the rotor.

Figure 2A:
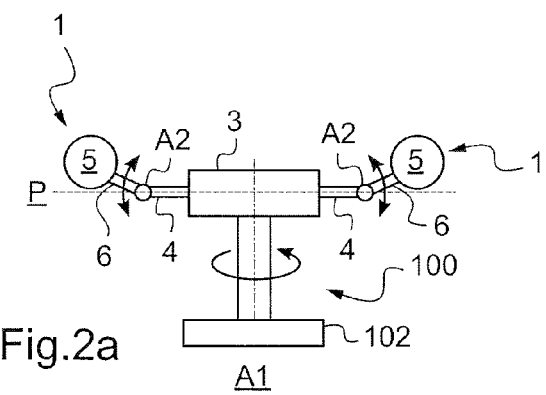
FIG. 2 shows a rotor head provided with pendular resonators that are hinged to said rotor head, and it comprises diagrams a, b, and c showing various respective positions taken up by the moving pendular masses included in said resonators.
Figure 2B:
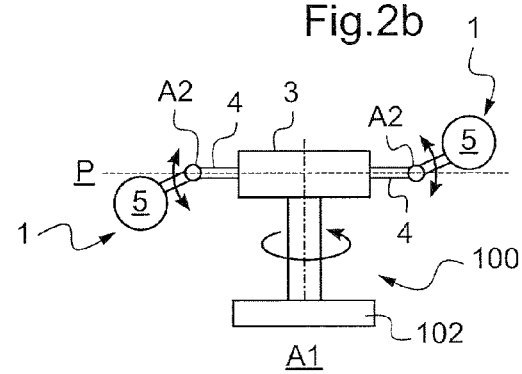
Figure 2C:
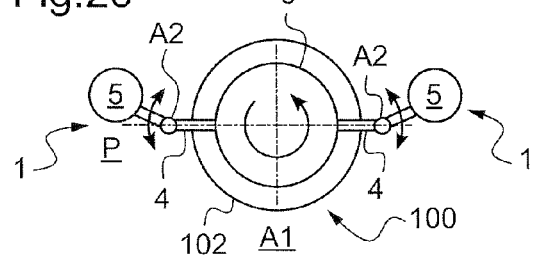

In FIG. 2, diagrams a, b, and c show how a pendular resonator 1 operates, the resonator being of known type and used in the field of flying machines having a rotor 100 provided with a hub 102, and in particular in the field of rotorcraft. Overall, such a flying machine associates a carrier structure 106 fitted with engine means for providing it with lift and also thrust, the rotor 100 being designed to be engaged on said engine means. The carrier structure is subjected to vibratory stresses due to harmonic vibrations of the rotating rotor 100 and/or to aeroelastic instabilities.

These vibratory stresses due to harmonic vibrations generate vibration that gives rise to forces on the rotor 100. These forces are oriented as follows:
- axially along the axis of rotation A1 of the rotor head;
- in the general plane P of the rotor head; and
- tangentially to the rotary path of the rotor head, thereby generating torque.

The vibratory stresses due to diverging vibratory phenomena lead to aeroelastic instabilities of the structures. To counter these stresses, the rotor head comprises a support 3 having branches 4, each of which carries a pendular resonator 1. Each pendular resonator 1 comprises a mass 5 carried as a pendulum by means of an arm 6 that is hinged to a branch 4 associated therewith. In the example shown, the mass 5 is hinged in pendular manner to the moving branch 4.

The pendular resonators 1 are structured and carried by the hub 3 to damp the vibration to which the rotor 100 is specifically subjected. In diagrams a and b, the pendular masses 5 are hinged to the support 3 about respective pivot axes A2 orthogonal to the axis of rotation A1 so that they are movable relative to the general plane P of the support 3, acting outside said plane P. In diagram a, the pendular masses 5 generate an axial force outside the plane P, and in diagram b, the pendular masses 5 generate a moment outside the plane P. In diagram c, the pendular masses 5 are hinged to the support 3 about respective pivot axes A2 that are parallel to the axis of rotation A1 of the rotor 100, the pendular masses 5 generating a force in the general plane P of the support 3.

Such pendular resonators 1 are suitable for dealing with vibration frequencies associated with harmonics of the rotor, but they do not take account of the characteristics of the carrier structure, i.e. the fuselage in a helicopter application, relating to its mass and its excitation frequency in particular. Such pendular resonators are not suitable for dealing with frequencies that are asynchronous relative to the rotor. It is recalled that providing damping at a very low level using additional means might possibly be sufficient.

In FIGS. 3 to 8, a rotor 100 is shown with a support 3 and at least one branch 4 for fastening a mechanism 90 that is associated therewith. Each of the branches 4 of the hub 3 is fitted at its free end with a pendular resonator 1 of the type that is shown in FIG. 2, in particular for damping the harmonic vibrations to which the rotor 100 is subjected in rotation. To improve vibration filtering and to prevent vibration modes of the rotor coupling with vibration modes of the structure carrying the rotor, the mechanism 90 is fitted with damper means 8 for damping the pendular movement of each mass 5. These damper means 8 take account of the characteristics specific to the carrier structure 106 in question, in particular its mass and its excitation frequency. The objective is then to increase in positive manner the damping coefficients of the airfoil surfaces or indeed of the fuselage.

More particularly, the rotor 100 is fitted with a mechanism 90 for damping vibration that associates pendular resonators 1, each having a mass 5 carried by a hinged arm 6 of mobile mounting means for mounting the mass 5 to move on the hub 3, with damper means 8 for damping the movements of the pendular resonators 1.

These damper means 8 are associated with respective pendular resonators 1 to counter their effect as a function of characteristics specific to the carrier structure, being interposed between the corresponding pendular resonator 1 and an engagement member 9 for engaging the support 3 of the rotor head 2. Such damper means 8 may be of the mechanical or elastic deformation type, as shown in FIGS. 3 and 4, or they may be of the electromagnetic type implementing co-operative magnetic members associated respectively with the mass 5 and with the support 3, as shown in FIGS. 5 to 8.

The vibration damper mechanism 90 of the present invention is compact and of reduced weight, and it makes use of already-existing members of the support 3 for implanting damper means 8, pendular resonators 1 in particular, and more particularly the hinged arms 6 and/or the masses 8 that they comprise. Installation and adjustment of the damper means 8 may be performed as an option, or may be performed on an existing aircraft, as a function of needs or instabilities of the carrier structure that have been observed in use. Such installation may be performed without major structural modification of the existing rotor 100 and/or of the existing carrier structure, and the damper means 8 may easily be selected and put into place depending on requirements and/or depending on the type of flying machine on which the mechanism(s) is/are to be installed.

Figure 3:
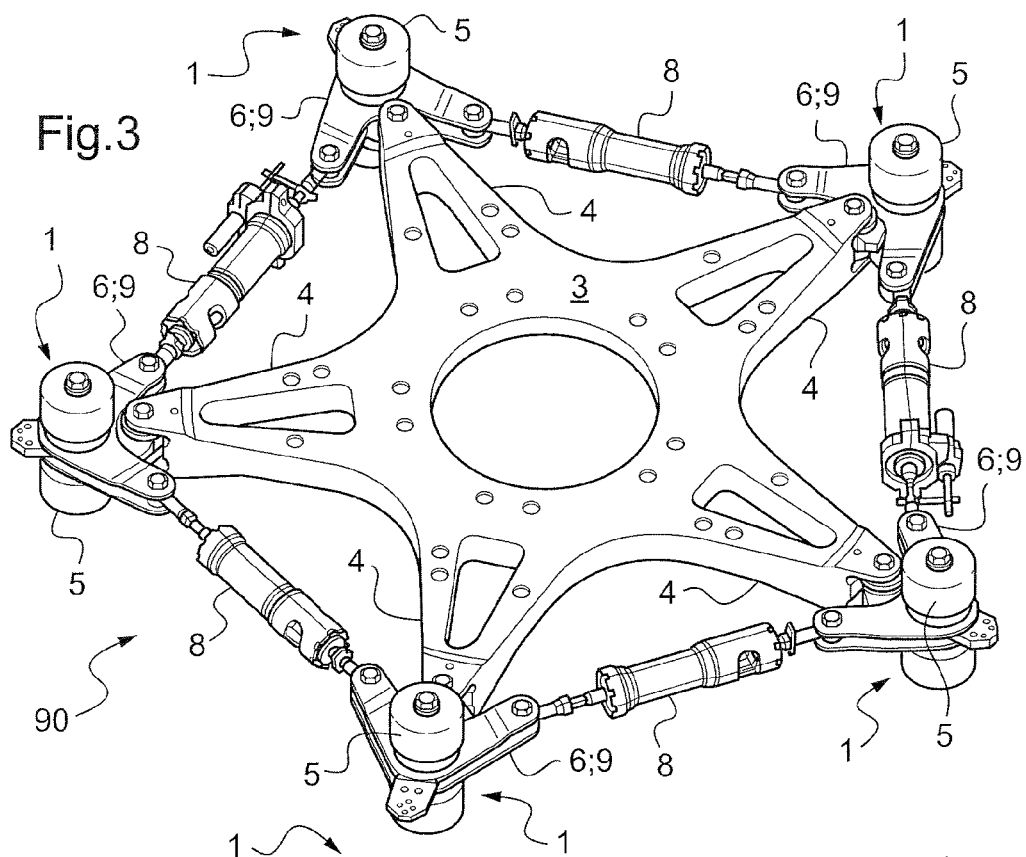
FIGS. 3 and 4 are illustrations of a rotor head fitted with a mechanism of the present invention in respective different embodiments, seen in a plane orthogonal to the axis of rotation of the rotor head.
Figure 4:
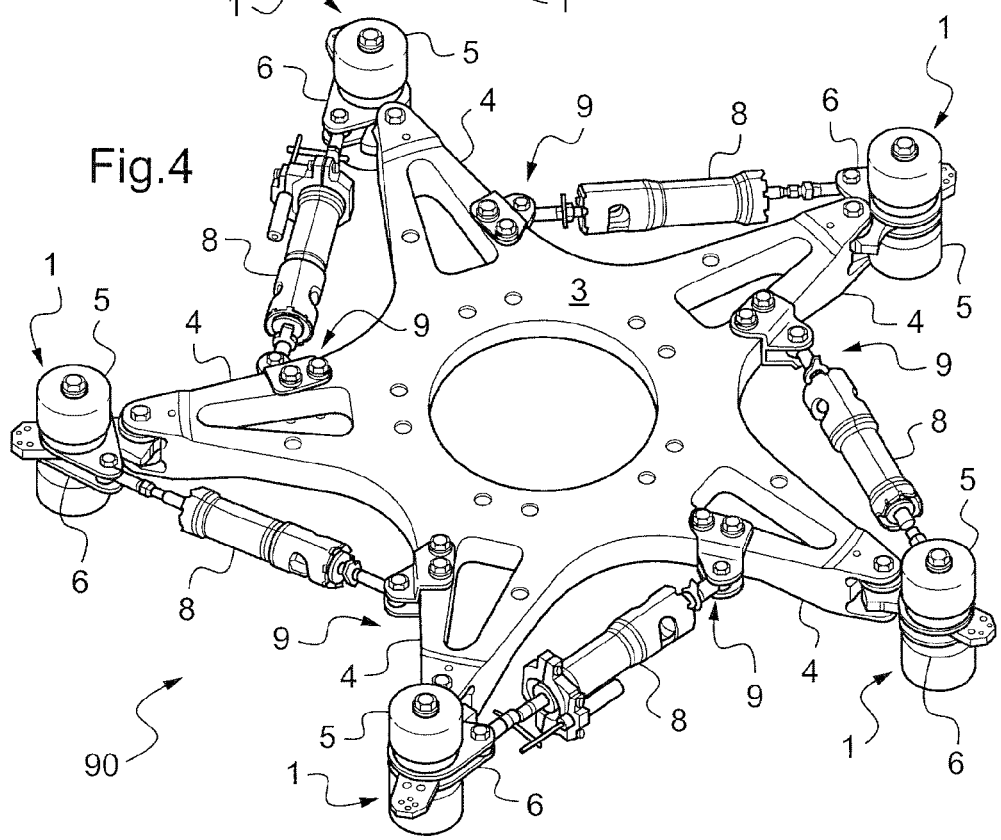

In FIGS. 3 and 4, the rotor head 2 is shown in the general plane of the support 3 that it comprises. The support 3 has five radially-distributed branches 4 co-operating with the support 3 to form a one-piece unit that may be obtained by casting. Pendular resonators 1 are installed at the free ends of the branches 4 via the hinged arms 6 they include. These arms 6 are hinged between their ends to the associated branch 4 about a pivot axis A2 that is parallel to the axis of rotation A1 of the support 3. For each of the resonators 1, the mass 5 and the damper means 8 associated therewith are mounted at a respective end of the corresponding hinged arm 6. In the embodiment shown, the damper means 8 are constituted by oleo struts. The hinged arms 6 are advantageously arranged as lever arms, such that the effect produced by the pendular mass 5 is amplified. Such amplification serves to reduce the overall size and weight of the mechanism, in addition to operation advantageously associated between two damper means 8 associated with adjacent resonators 1, as shown in FIG. 3.

More particularly, in the variant shown in FIG. 3, the hinged arms 6 are T-shaped and the damper means 8 that are associated therewith are successively and respectively engaged on one of the limbs of the T-shape of the hinged arms 6 of a pendular resonator 1, and on the other limb of the hinged arm 6 forming part of an adjacent pendular resonator 1. In this variant, the hinged arm 6 of a given pendular resonator 1 is thus an engagement member 9 for engaging damper means 8 coming from a pendular resonator 1 adjacent to said given pendular resonator 1.

A single damper means 8 is used in conjunction by two adjacent pendular resonators 1, in co-operation with another damper means 8 successively connecting said pendular resonators 1 to a following pendular resonator 1.

Still more particularly, in the variant shown in FIG. 4, the hinged arms 6 are arranged as lever arms, being angled and hinged to the support 3 in the zones of their angles. One of the ends of damper means 8 associated with a pendular resonator 1 is hinged to the free end of the angle of the corresponding hinged arm 6, and its other end is engaged on the support 3, in particular on a branch 4 adjacent to the branch carrying said pendular resonator 1. In this variant, each branch 4 carrying a given pendular resonator 1 constitutes an engagement member 9 for engaging a damper means 8 coming from a pendular resonator 1 adjacent to said given pendular resonator 1.

Figure 5:
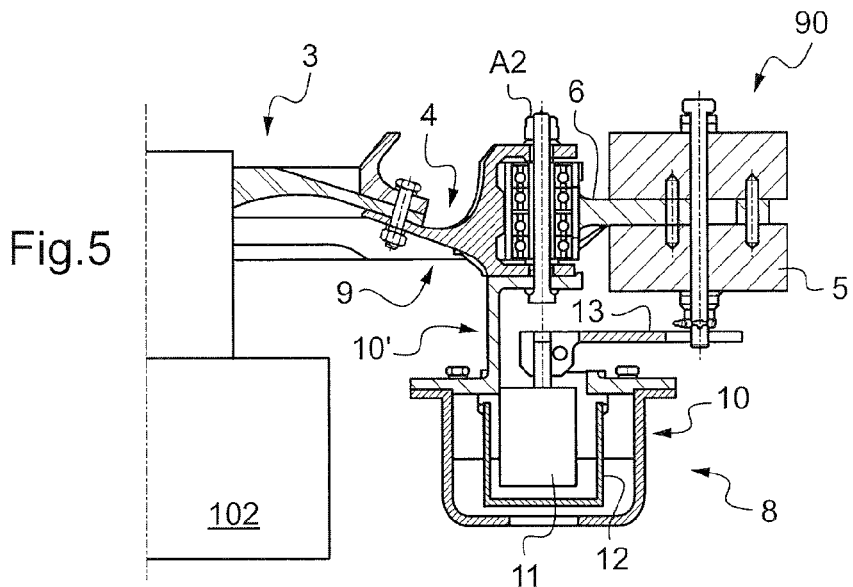
FIG. 5 is a fragmentary view in axial section of a rotor head fitted with a mechanism of the present invention in another embodiment.

In FIG. 5, a rotor 100 is shown in part, to illustrate an embodiment of a mechanism 90 of the invention. The support 3 carries a pendular resonator 1 having its arm 6 hinged about a pivot axis A2 parallel to the axis A1 of rotation of the support 3. The damper means 8 are of the electromagnetic type and they associate two co-operating magnetic members 10 and 11, one of which is arranged as a cage 10 having a body 11 forming the other magnetic member placed therein. The body 11 is constituted by a magnetic mass and the cage 10 incorporates an electromagnetic element 12, such as an open-circuit coil or a coil short-circuited through a resistor, thereby obtaining spontaneous damping of the pivoting movement of the hinged arm 6. The damper means 8 are carried by the branch 4 of the support 3 that carries the pendular resonator 1, being located so as to be axially offset relative to the general plane P in which the resonator 1 moves. The body 11 is connected to the mass 5 of the pendular resonator 1 via a drive crank 13. Pivoting movement of the hinged arm 6 is braked by the body 11 co-operating with the electromagnetic element 12 housed in the cage 10, and the vibration to which the pendular resonator 1 is subjected is damped by taking account of the characteristics of the carrier structure and/or the imperfections that have been observed in the resulting vibration absorption, on the basis of which the damper means 8 are adjusted.

Each damper means 8, and more particularly the cage 10, is fastened by means of a dedicated member 10' to a stationary member 9 for engaging it, specifically a branch 4 of the support 3.

A distinction between the results specifically obtained by the resonator 1 on its own and in association with the damper means 8, lies in an ability to damp vibrations at significantly different frequencies, respectively relating to the rotor 100 and to the carrier structure 106. The pendular resonators 1 act along the centrifugal force induced by the rotary motion of the rotor 100, so they are spontaneously adjusted as a function of the speed of rotation of the rotor 100. The pendular resonators 1 damp vibrations induced by forced excitation at a frequency corresponding to one or more harmonics of the rotor 100 over one or more narrow frequency bands. The mechanism 90 of the present invention associating the pendular resonators 1 and the damper means 8 allocated thereto vibrates in phase quadrature relative to the carrier structure 106 and oppose movement thereof, with a fraction of the resulting damping being transferred to the carrier structure 106. Furthermore, the damping obtained by the damper means 8 against the movement of the pendular resonators 1 gives rise above all to an increase in the vibration frequency band relative to that obtained by the pendular resonators 1 on their own, and consequently serves to satisfy the need for damping vibration derived from aeroelastic instabilities.

Figure 6:
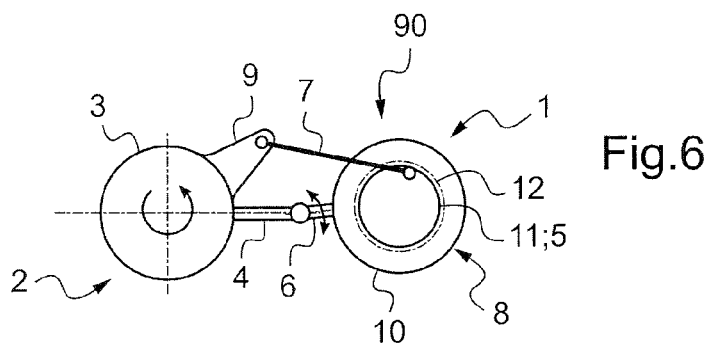
FIG. 6 is a diagram of a rotor head fitted with a mechanism of the present invention in another embodiment, seen in a plane orthogonal to the axis of rotation of the rotor head.

In FIG. 6, a rotor 100 is fitted with a mechanism in another embodiment of the present invention. The damper means 8 are of the electromagnetic type and they are carried by the hinged arm 6 that the pendular resonator 1 includes. The damper means 8 associate a cage 10 that incorporates a magnetic element 12 and that houses a coaxial magnetic body 11. The body 11 is formed at least in part by the mass 5 of the pendular resonator 1 and it is connected to an engagement member 9 for engaging the support 3 via a connecting rod 7 that is hinged to its periphery.

Figure 7:
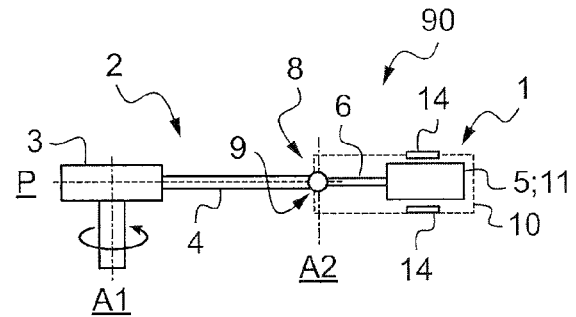
FIGS. 7 and 8 are diagrammatic views of a rotor head fitted with a mechanism of the present invention in another embodiment, respectively seen in a plane orthogonal to and in a plane parallel to the axis of rotation of the rotor head.
Figure 8:
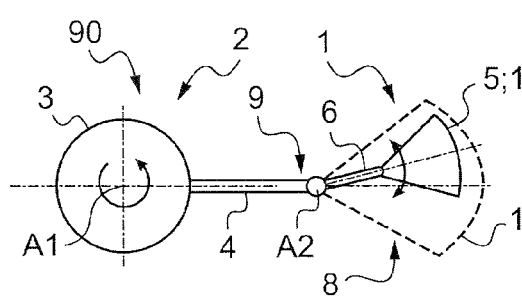

FIGS. 7 and 8 show a rotor 100 fitted with a mechanism in another embodiment of the present invention. The damper means 8 are of the electromagnetic type and they associate a body 11 formed at least in part by the mass 5 of the pendular resonator 1, which mass is housed inside a cage 10 carried by an engagement member 9 for engaging the hub 3 on which the resonator 1 is hinged via the hinged arm 6. The cage incorporates electromagnetic elements 14 such as tracks or coils, which elements are located with an axial offset relative to the general plane P in which the resonator 1 moves, by being placed on either side of the body 11. These electromagnetic elements 14 are, in particular, shaped as angular sectors such that the mass 5 of the pendular resonator 1 is held close to the electromagnetic elements 14 while it is pivoting as a result of the rotation of the rotor head 2.

What is claimed is:

1. A mechanism for damping vibrations to prevent coupling of vibration modes of the carrier structure with vibration modes of a rotor secured to said carrier structure, wherein the mechanism comprises:
   a support suitable for being fastened to said rotor;
   at least one resonator including a mass carried by said support in a pendular manner via mobile mounting means for mounting said mass to move on said support; and
   damper means for damping the resonator, said damper means being interposed between first and second adjacent engagement members, wherein said mobile mounting means comprise one hinged arm per mass, each hinged arm being arranged as a lever arm having a longitudinal axis, being hinged to the support and being hinged to the damper means through the first engagement member at one end and carrying the mass at another end, with a center of mass of the mass in line with the longitudinal axis in a plane of rotation.

2. A mechanism according to claim 1, wherein the resonator constitutes means suitable for opposing vibration over a first narrow frequency range as induced by forced excitation to which the rotor is subjected, and wherein the damper means associated with the resonator are suitable for opposing vibration originating from instability in a second frequency range that is wider than said first frequency range and being adapted as a function of at least one of the characteristics of the carrier structure of the flying machine and imperfections observed in the damping of vibration.

3. A mechanism according to claim 1, wherein the engagement member may equally well be a stationary member or a movable member of said mechanism.

4. A mechanism according to claim 1, wherein the mass is movable in pivoting about at least one pivot axis (A2) that may equally well be oriented parallel to and/or perpendicular to an axis of rotation (A1) of the support.

5. A mechanism according to claim 1, wherein a plurality of resonators are movably mounted on the support, the damper means being interposed between the mobile mounting means of two adjacent resonators and on which the damper means are jointly engaged.

6. A mechanism according to claim 5, wherein the damper means are of the elastic or mechanical deformation type.

7. A mechanism according to claim 1, wherein said mechanism is passive.

8. A mechanism according to claim 1, wherein the damper means are of hydraulic, pneumatic, elastic, or magnetic type.

9. A mechanism according to claim 1, wherein the damper means are of the elastic or mechanical deformation type.

10. A flying machine having a rotor and a carrier structure including an airframe and a mounting structure for mounting the rotor to said airframe, wherein said rotor includes a vibration damper mechanism according to claim 1 to prevent vibration modes of said carrier structure coupling with vibration modes of said rotor.

11. A mechanism for damping vibrations to prevent coupling of vibration modes of the carrier structure with vibration modes of a rotor secured to the carrier structure, wherein the mechanism comprises:
    a support suitable for being fastened to the rotor, the support having a plurality of arms defining a plane and having a central axis extending orthogonally to the plane;
    at least one resonator for opposing vibrations over a first frequency range, the resonator including a mass carried by the support via mobile mounting means for mounting the mass to move on the support, the mobile mounting means having a central axis extending through the mobile mounting means parallel to the central axis of the support; and
    damper means for damping the resonator and opposing vibration over a second frequency range wider than the first frequency range, the damper means being interposed between adjacent engagement members, wherein the mobile mounting means comprise one hinged arm per mass, with each hinged arm being arranged as a lever arm and being hinged to the support and to the damper means and carrying the mass at another end, the mass having a center of mass and being supported by the mobile mounting means such that the center of mass of the mass is along the central axis of the mobile mounting means.

12. A mechanism according to claim 11, wherein the damper means are of the electromagnetic type, associating constituting magnetic members associated respectively with the resonator and with the support, one of the magnetic members being arranged as a cage incorporating at least one magnetic element, said cage housing a body forming at least part of the other magnetic member.

13. A mechanism according to claim 12, wherein said mobile mounting means comprise one hinged arm per mass, the hinged arm being mounted to move in pivoting on the support above a pivot axis (A2) parallel to the axis of rotation (A1) of the support.

14. A mechanism for damping vibrations to prevent coupling of vibration modes of the carrier structure with vibration modes of a rotor having a plurality of blades defining a plane of rotation of the rotor and secured to the carrier structure, wherein the mechanism comprises:
    a support configured to fasten to the rotor with the support above the plane of rotation, the support having a plurality of branches extending radially outward and having mobile mounting means hinged to the distal ends of the branches;
    at least one resonator including a mass carried by the support via the mobile mounting means for mounting the mass to move on the support, the mobile mounting means being pivotable about a pivot axis that is parallel to a support axis of rotation such that the mass is carried in a pendular manner; and
    damper means for damping the resonator, the damper means being interposed between adjacent engagement members, wherein the mobile mounting means comprise one hinged arm per mass, each hinged arm being arranged as a lever arm, being hinged to the support and being hinged to the damper means at a first end and carrying the mass at a second end.

15. A mechanism according to claim 14, wherein each hinged arm has a proximal end, a distal end spaced radially outward from the proximal end, and arm portions extending radially inward and axially away from the distal end, the distal end of the hinged arm being the second end of the lever arm, the proximal end being hinged to the distal end of the branch, and the first end of the lever arm being on one of the arm portions.

16. A mechanism according to claim 14, wherein the resonator is calibrated to damp vibration frequencies associated with harmonic vibrations of the rotor, and the damper is calibrated in response to characteristics specific to a carrier structure.

* * * * *